United States Patent [19]

Maeno et al.

[11] Patent Number: 4,747,966

[45] Date of Patent: May 31, 1988

[54] ELECTRICALLY CONDUCTIVE THERMOPLASTIC RESIN AND COATING COMPOSITIONS

[75] Inventors: Seiji Maeno, Tokyo; Hidetaka Ozaki, Yachiyo; Hisashi Yamada, Chiba; Osamu Ito, Matsudo, all of Japan

[73] Assignee: Lion Corporation, Tokyo, Japan

[21] Appl. No.: 913,195

[22] Filed: Sep. 30, 1986

Related U.S. Application Data

[63] Continuation-in-part of Ser. No. 837,980, Mar. 10, 1986, abandoned, which is a continuation-in-part of Ser. No. 712,826, Mar. 18, 1985, abandoned.

[30] Foreign Application Priority Data

Mar. 30, 1984 [JP] Japan ................................. 59-64270
Oct. 1, 1985 [JP] Japan ................................ 60-218922

[51] Int. Cl.$^4$ .......................... H01B 1/04; H01B 1/06
[52] U.S. Cl. .................................... 252/512; 252/513; 252/518; 252/500; 524/123; 524/124; 524/125; 524/439; 524/440; 524/441; 523/137; 523/451; 523/457; 523/458; 523/459; 523/452
[58] Field of Search .............. 524/123, 125, 124, 439, 524/440, 441, 837, 980; 252/512, 513, 500, 518; 523/137, 451, 452

[56] References Cited

U.S. PATENT DOCUMENTS 4,024,103  5/1977  Heinrich et al. ..................... 524/123
4,147,669  4/1979  Shaheen et al. ..................... 252/512
4,490,283 12/1984  Kleiner .............................. 250/512

Primary Examiner—Josephine Barr
Attorney, Agent, or Firm—Armstrong, Nikaido, Marmelstein & Kubovcik

[57] ABSTRACT

An electrically conductive thermoplastic resin and coating composition comprising a diphosphonic acid derivative having the formula:

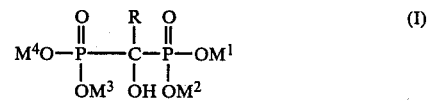

(I)

wherein R represents an alkyl or aryl group and $M^1$ to $M^4$ independently represent hydrogen or a cation.

The electrically conductive thermoplastic resin composition has excellent electrical conductivity and retains the electrical conductivity for extended periods without using expensive noble metals. Furthermore, the electrically conductive coating composition provides an excellent electrical conductivity and shielding property retention without using expensive noble metals.

15 Claims, No Drawings

ELECTRICALLY CONDUCTIVE THERMOPLASTIC RESIN AND COATING COMPOSITIONS

CROSS-REFERENCE TO RELATED APPLICATION

This application is a continuation-in-part of Ser. No. 837,980, filed Mar. 10, 1986, now abandoned which is a continuation-in-part of Ser. No. 712,826, filed Mar. 18, 1985 now abandoned.

BACKGROUND OF THE INVENTION

1. Field of the Invention

The present invention relates to an electrically conductive thermoplastic resin composition, containing metallic powder, suitable for use in the production of electrically conductive resin molded articles as well as electrically conductive coating compositions and electrically conductive adhesive compositions.

The present invention also relates to an electrically conductive coating composition, containing, as a main electrically conductive component, metallic powders in which the electrical conductivity is not decreased for an extended period.

2. Description of the Related Art

Various resin compositions containing the powder of noble metals have heretofore been used as electrically conductive resin molded articles as well as electrically conductive coating compositions and electrically conductive adhesive compositions. Noble metals such as gold and silver are preferable because they are stable against oxidation and afford an excellent electrical conductivity to the compositions containing the same and also retain a stable electrical conductivity for extended periods. Powders of these noble metals, however, are very expensive, and accordingly, when compositions containing a noble metal powder are used as electromagnetic wave shielding molded articles or coating compositions, the production cost becomes high, and, therefore, practical application is difficult. Furthermore, although remarkable developments have been made in various electronic appliances such as computers, video tape recorders, audio appliances, electric appliances, and word processors, these electronic appliances have disadvantages in that erroneous actuation is likely to occur due to electromagnetic waves from the outside, since the electric current used becomes very small because of the use of highly integrated electronic circuits and elements.

Various plastic molded articles are widely used as housings of the above-mentioned electronic appliances because of the need for light weight articles, cost-reductions, and mass production. Plastic molded articles do not provide a shielding effect against electromagnetic waves and, therefore, the electromagnetic wave is transmitted through the plastic molded articles. Thus, the above-mentioned disadvantages cannot be solved in this case.

Various attempts have been made to provide plastic molded articles with shielding effects against electromagnetic waves (i.e., electromagnetic wave shielding properties). For example, electrically conductive coating compositions are coated on the housings of electronic appliances to shield them from electromagnetic waves from the outside and those generated from the appliances themselves. Electrically conductive coating compositions are those containing electrically conductive fine powders dispersed in organic binders. Examples of the electrically conductive fine powders conventionally used are gold, silver, nickel, and copper. Although noble metal powders such as gold and silver have excellent electrical conductivity and are stable against oxidation, and thus retain a stable electrical conductivity for a long time, the powders of these noble metals are very expensive. Accordingly, when noble metallic powders are used as electromagnetic wave shielding coating compositions, the production cost becomes high, and, therefore, a practical application thereof is difficult.

For the above-mentioned reasons, although various attempts have been made, in electrically conductive compositions, to use the powder of inexpensive metals other than the noble metals, such as nickel, copper, iron, and aluminum (i.e., metallic powders), satisfactory results have not been obtained. For example, copper, which is commercially available in large amounts at a cost approximately one hundredth that of silver, the most inexpensive noble metal, has a good electrical conductivity, but copper powder is susceptible to oxidization in coating compositions, and an electrically non-conductive oxide layer will form on the surface of the copper powder, reducing the electrical conductivity, as well as the electromagnetic wave shielding properties, with the lapse of time. Thus, improvements in these properties are desired.

The surface of a commercially available metallic powder is generally covered with an electrically non-conductive oxide layer. Therefore, the desired electrical conductivity cannot be obtained when the commercially available metallic powder is directly incorporated into coating compositions. The oxide layer on the surface of the metallic powder can be conventionally removed by washing the metallic powder with an aqueous acid solution such as hydrochloric acid. But, even when the metallic powder thus washed is mixed with an organic binder to produce a coating composition, the electrical conductivity of the resultant coating composition is lost after the composition is allowed to stand for several days under ambient conditions, although the desired electrical conductivity is exhibited immediately after the formulation or production thereof.

SUMMARY OF THE INVENTION

Accordingly, the objects of the present invention are to eliminate the above-mentioned problems in the prior art and to provide an electrically conductive thermoplastic resin compostion having an excellent electrical conductivity and long-term electrical conductivity retention without using expensive noble metals.

Another object of the present invention is to provide an electrically conductive coating composition having excellent electrical conductivity and shielding properties and a long-term electrical conductivity and shielding property retention without using expensive noble metals.

Other objects and the advantages of the present invention will be apparent from the following description.

In accordance with the present invention, there is provided an electrically conductive thermoplastic resin composition comprising: (i) at least one thermoplastic resin selected from the group consisting of low-density polyethylene, high-density polyethylene, linear low-density polyethylene, polypropylene, polystyrene, ethylene-vinyl acetate copolymer, ABS resin, MMA resin, ethylene-acrylate copolymer, polyamide resin, and polyester resin; (ii) at least one metallic powder selected from the group consisting of nickel, copper, iron, and aluminum, and the alloys thereof; and (iii) 0.5 to 9 parts by weight, based on 100 parts by weight of the metallic powder, of a diphosphonic acid derivative having the formula:

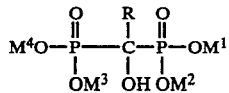

wherein R represents an alkyl group preferably having 1 to 18 carbon atoms and an aryl group such as a phenyl group or an alkylphenyl group having an alkyl group with 1 to 8 carbon atoms, and $M^1$ to $M^4$ independently represent hydrogen or a cation; wherein the weight ratio of the component (i) to the component (ii) (i.e., (i)/(ii)) is 40/60 to 6/94.

In accordance with the present invention, there is also provided an electrically conductive coating composition comprising:

(i) at least one metallic powder;

(ii) at least one film-forming resin selected from the group consisting of thermoplastic resins and thermosetting resins; and (iii) at least one diphosphonic acid derivative having the formula:

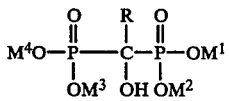

wherein R represents an alkyl or aryl group and $M^1$ to $M^4$ independently represent hydrogen or a cation.

DESCRIPTION OF THE PREFERRED EMBODIMENT

According to the present invention, the above-mentioned problems can be effectively solved by modifying the surface of the metallic powder with the specified diphosphonic acid derivative (or sequestering agent).

The thermoplastic resins usable in the present invention can be any of the conventional thermoplastic resins, which are appropriately selected depending upon the intended use of the resultant electrically conductive thermoplastic resin composition. Typical examples of such thermoplastic resins are low-density polyethylene, high-density polyethylene, linear low-density polyethylene, polypropylene, polystyrene, ethylene vinyl acetate copolymer, acrylonitrile butadiene styrene (ABS) resin, methyl methacrylate (MMA) resin, ethylene-acrylate copolymer (e.g., ethylene ethylacrylate (EEA) resin), polyamide resin (e.g., nylon resin), and polyester resin. These thermoplastic resins can be used alone or in any mixture thereof. As mentioned above, the thermoplastic resin is suitably contained in an amount of 6% to 40% by weight, preferably 8% to 40% by weight, based on the total amount of the thermoplastic resin and the metallic powder in the electrically conductive composition.

The diphosphonic acid derivatives usable in the present invention are those having the above-mentioned formula (I), wherein R is an alkyl group such as those having 1 to 18 carbon atoms or an aryl group such as a phenyl group or a substituted phenyl group, e.g., an alkyl phenyl group having an alkyl group with 1 to 8 carbon atoms, and $M^1$ to $M^4$ are hydrogen or cations. $M^1$ to $M^4$ may be the same or different from each other. The cations may be inorganic and organic cations. Examples of such cations are the cations of alkali metals such as sodium and potassium, the cations of alkaline earth metals such as magnesium and calcium, and ammonium cations represented by the formula $N(R_1)_4$. In the formula $N(R_1)_4$, $R_1$ independently represents hydrogen, an alkyl group or an aryl group, or a substituted alkyl or aryl group such as those substituted with a halogen atom, a hydroxyl group, an amino group, an amido group, or a carboxyl group.

Typical examples of the above-mentioned diphosphonic acid derivatives are 1-hydroxyethane-1,1-diphosphonic acid (HEDP), disodium 1-hydroxyethane-1,1-diphosphonate (HEDP-2Na) calcium 1-hydroxyethane-1,1-diphosphonate (HEDP-Ca), diammonium 1-hydroxyethane-1,1-diphosphonate (HEDP-2NH₃), ditriethanol amine 1-hydroxyethane-1,1-diphosphonate (HEDP-2TEA), tetratriethanol amine 1-hydroxyethane-1,1-diphosphonate (HEDP-4TEA), dianiline 1-hydroxyethane-1,1-diphosphonate (HEDP-2NH₂-Ph), di(2-ethyl)hexylamine 1-hydroxyethane-1,1-diphosphonate (HEDP-2EHA), tetra(2-ethyl)hexylamine 1-hydroxyethane-1,1-diphosphonate (HEDP-4EHA), 1-hydroxypropane-1,1-diphosphonic acid (HPDP), 1-hydroxydodecane-1,1-diphosphonic acid (HDDP), 1-hydroxyoctadecane-1,1-diphosphonic acid (HODP), 1-hydorxyphenylmethane-1,1-diphosphonic acid (HPhDP), 1-hydroxybutane-1,1-diphosphonic acid (HBDP), 1-hydroxyheptane-1,1-diphosphonic acid, 1-hydroxyhexane-1,1-diphosphonic acid, 1-hydroxy-1-(p-methyl)phenylmethane-1,1-diphosphonic acid, and 1-hydroxy-1-(p-ethyl)phenylmethane-1,1-diphosphonic acid. These diphosphonic acid derivatives can be used alone or in any mixture thereof.

The diphosphonic acid should be used in an amount of 0.5 to 9 parts by weight, preferably 1 to 8.8 parts by weight, based on 100 parts by weight of the metallic powder contained in the electrically conductive thermoplastic resin composition. The use of the diphosphonic acid in an amount of less than 0.5 part by weight based on 100 parts by weight of the metallic powder cannot desirably improve the electrical conductivity of the resultant composition. Contrary to this, the use of the diphosphonic acid in an amount of more than 9 parts by weight based on 100 parts by weight of the metallic powder causes an undesirable bleedout of the diphosphonic acid.

Although there are no critical limitations to the amount of the diphosphonic acid derivatives in the coating compositions, the diphosphonic acid derivatives are preferably used in an amount of 0.1 to 8.0 parts by weight, preferably 0.3 to 8.0 parts by weight, based on 100 parts by weight of the metallic powder contained in the electrically conductive coating compositions. The use of the diphosphonic acid derivatives in an amount of less than 0.1 part by weight based on 100 parts by weight of the metallic powder does not sufficiently prevent the decrease in the electrical conductivity of the resultant composition. Conversely, if the diphosphonic acid derivatives are used in an amount of more than 8.0 parts by weight based on 100 parts by weight of the metallic powder, pastes containing the metallic powder uniformly dispersed therein are not likely to be formed.

The metallic powder usable in the present invention is the powder of metals and the alloys thereof subject to oxidation, when allowed to stand in air for extended periods, and thus forming oxide layers on the surfaces thereof. Such metals are those other than the noble metals (e.g., gold and silver), which are not substantially oxidized under ambient conditions. Typical examples of such metals and the alloys thereof are nickel, copper, iron, aluminum, and the alloys thereof. These metals and alloys can be used alone or in any mixture thereof.

The metallic powder can be in any shape including, in addition to finely divided granular powder, a fibrous powder and a thin flake powder. For example, in the case of a granular powder, powder having a size of 150 meshes or less, preferably 200 mesh or less in terms of Tyler mesh, is preferably used in the present invention. In the case of a fibrous powder, powder having an individual fiber diameter of 100 μm or less and a length of approximately 5 mm or less is preferably used in the present invention.

There is no specific limitation to the content of the metallic powder in the electrically conductive thermoplastic resin composition according to the present invention, as long as the desired electrical conductivity of the composition can be exhibited. The amount of metallic powder in the electrically conductive composition is suitably 60% to 94% by weight, preferably 60% to 92% by weight, based on the total amount of the thermoplastic resin and the metallic powder in the composition. In general, a metal powder having a relatively large specific gravity is desirably used in a large content from the viewpoint of the volume ratio. The use of too large an amount of metal powder, however, will result in a decrease in the moldability of the resultant electrically conductive thermoplastic composition.

There is no specific limitation to the content of the metallic powder in the electrically conductive coating composition according to the present invention, as long as the desired electrical conductivity of the composition can be exhibited. The amount of the metallic powder in the electrically conductive coating composition is suitably 35% to 94% by weight, preferably 50% to 90% by weight, and more preferably 60% to 90% by weight, based on the total amount of the resin and the metallic powder in the coating composition. In general, metal powder having a relatively large specific gravity is desirably used in a large content from the viewpoint of the volume ratio. If, however, too large an amount of metal powder is used, it becomes difficult to form a paste thereof and, therefore, the coating operation becomes difficult.

The resins usable in the coating composition according to the present invention are any of the thermoplastic and thermosetting resins conventionally used in coating compositions. Typical examples of such thermoplastic resins are thermoplastic acrylic resins, vinyl resins, urethane resins, alkyd resins, polyester resins, and hydrocarbon resins. Typical examples of such thermosetting resins are thermosetting acrylic resins, phenol resins, unsaturated polyester resins, epoxy resins, urethane resins, and alkyd resins. These resins can be used alone or in any mixture thereof. The amount of the resin is suitably 6% to 65% by weight, preferably 10% to 50% by weight, and more preferably 10% to 40% by weight, based on the total amount of the resin and the metallic powder in the coating composition.

The electrically conductive coating compositions according to the present invention may contain, in addition to the above-mentioned essential components, diluting solvents as well as conventional ingredients such as antioxidants, U.V. absorbers, flame retardents, and fillers. Furthermore, conventional processing or molding aids such as heat stabilizers and lubricants can be also incorporated into the electrically conductive thermoplastic resin compositions of the present invention.

Examples of the organic solvents usable in the coating composition according to the present invention are alcohols such as butanol; ketones such as methyl ethyl ketone; esters such as ethyl acetate; aromatic hydrocarbons such as toluene and xylene; and ethers such as turpentine oil, butyl cellosolve (available from U.C.C.), and Carbitol (available from U.C.C.). Although there are no critical limitations to the amounts of the solvents contained in the coating compositions, the solvents are suitably contained in 10 to 500 parts by weight, preferably 30 to 200 parts by weight, based on 100 parts by weight of the total amount of the metallic powder and the resin. Furthermore, to prevent the setting of the metallic powder in the present coating composition during storage or to facilitate a good dispersibility of the metallic powder in the present coating compositions, thixotropy- providing agents such as colloidal silica or coupling agents such as silane coupling agents can be used in the present coating composition.

The diphosphonic acid can be incorporated into the electrically conductive thermoplastic resin composition in any conventional manner. For example, the metallic powder and the diphosphonic acid are first mixed, followed by mixing with the thermoplastic resin. Alternatively, the diphosphonic acid can be first mixed with the thermoplastic resin, followed by mixing with the metallic powder. Furthermore, the thermoplastic resin, the metallic powder, and the diphosphonic acid can be simultaneously mixed together to form the desired electrically conductive thermoplastic resin composition. The electrically conductive thermoplastic resin composition according to the present invention can be processed or molded into any conventional form or shape depending upon the intended final use. For example, the electrically conductive thermoplastic resin composition can be formed into the shape of sheets or films by using a processing means such as calender rolls, inflation molding machines, or heat presses to form electrically conductive molded articles in the form of sheets or films.

In the preparation of the electrically conductive coating composition according to the present invention, the diphosphonic acid derivative can be incorporated into the electrically conductive coating composition in any conventional manner. For example, the diphosphonic acid derivative can be first mixed with the resin and the solvent, followed by mixing with the metallic powder. Alternatively, the metallic powder can be first treated in a mixture of the diphosphonic acid derivative and a portion of the organic solvent, followed by mixing with the resin and the remainder of the organic solvent. Furthermore, the diphosphonic acid derivative and the metallic powder can be first mixed, followed by mixing with the resin and the organic solvent, or the metallic powder, the resin, the phosphonic acid derivative, and the organic solvent can be simultaneously mixed together to form the desired electrically conductive coating composition.

The electrically conductive coating composition according to the present invention can be applied, for example, to the back surface of plastic molded articles by any conventional manner, for example, spray coating, brush coating, and screen printing.

As mentioned above, according to the present invention, the desired electrically conductive thermoplastic resin composition having an excellent electrical conductivity and long-term electrical conductivity retention can be obtained without using expensive noble metals, by using the specified diphosphonic acid in combination with the metallic powder. Furthermore, according to the present invention, bleedout of the diphosphonic acid from the formed or molded electrically conductive thermoplastic resin composition does not occur.

As mentioned above, according to the present invention, the desired electrically conductive coating composition having an excellent electrical conductivity and long-term electrical conductivity retention can be obtained without using expensive noble metals, by using the specified diphosphonic acid derivative in combination with the metallic powder.

Thus, the electrically conductive coating composition according to the present invention provides an electrical resistance value of $4 \times 10^{-1}$ $\Omega/\square$ and a shield effect of 60 dB at a coating thickness of 100 $\mu$m. Thus, when compared to the case where a diphosphonic acid derivative is not used, the resistance value becomes about one-tenth and the shield effects can be improved by about 20 dB at 300 MHz. Furthermore, an increase in the electrical resistance of the coating composition with the lapse of time was not observed during an exposure test at room temperature and at a temperature of 100° C., unlike the conventional shielding coating composition, and, therefore, the present coating composition can be practically used as a shielding coating composition.

Furthermore, the electrically conductive coating composition according to the present invention has an excellent electrical conductivity and long-term electrical conductivity retention and, therefore, the present coating composition can be applied to the printed wiring and electrodes of printed circuit boards.

EXAMPLES

The present invention now will be further illustrated by, but is by no means limited to, the following examples, in which all parts and percentages are expressed on a weight basis unless otherwise specified.

The physical properties of the compositions are evaluated as follows.

(1) The electrical conductivity was evaluated in terms of the specific volume resistivity as determined by the SRIS 2301 method of the Japan Rubber Manufactures' Association.

(2) The overall bleedout property was evaluated by visually determining the bleedout and the gloss (Japan Industrial Standard (JIS) Z 8741) of molded articles immediately after molding and after allowing the molded articles to stand for 6 months at a temperature of 20° C. and a relative humidity of 60% in a constant temperature and humidity chamber. The bleedout property was evaluated based on the following criteria.

+: No bleedout was visually observed and the gloss was 75% or more of that of the blank.

±: Either bleedout was visually observed or the gloss was less than 75% of that of the blank.

−: Bleedout was visually observed and the gloss was less than 75% of that of the blank.

(3) The moldability of the composition was evaluated in terms of a rotor torque value when the composition was mixed or kneaded at a jacket temperature of 180° C. and a rotor speed of 40 rpm by using a 100 ml volume kneader (i.e., a labo-type plastomill manufactured by Toyo Seiki Seisakusho, Japan). When the rotor torque value was 250 kg.cm or less, the composition could be readily press-molded at a temperature of 180° C. and a pressure of 150 kg/cm² to a 15 cm square plate having a thickness of 2 mm.

Example 1

A 5 part amount of each sequestering agent listed in Table 1 was mixed or kneaded, together with 15 parts of polypropylene and 85 parts of metallic copper powder, at a temperature of 180° C. in a labo-type plastomill. The resultant mixture was then press-molded at a temperature of 200° C. under a pressure of 150 kg/cm² to form a 15 cm square plate having a thickness of 2 mm.

The electrical conductivity and the bleedout property of the molded plates obtained above were determined. The results were as shown in Table 1.

TABLE 1

| Sample No. | Sequestering agent | Specific volume resistivity ($\Omega \cdot$ cm) | | Bleedout property | |
|---|---|---|---|---|---|
| | | After molding | 6 months after | After molding | 6 months after |
| 1* | None | $4.3 \times 10^5$ | $6.9 \times 10^7$ | + | + |
| 2 | HEDP | $2.2 \times 10^{-2}$ | $2.5 \times 10^{-2}$ | + | + |
| 3 | HPDP | $2.7 \times 10^{-2}$ | $2.9 \times 10^{-2}$ | + | + |
| 4 | HEDP-2Na | $2.3 \times 10^{-2}$ | $2.5 \times 10^{-2}$ | + | + |
| 5 | HEDP-2NH$_3$ | $2.6 \times 10^{-2}$ | $2.6 \times 10^{-2}$ | + | + |
| 6 | HEDP-4NH$_3$ | $2.6 \times 10^{-2}$ | $2.6 \times 10^{-2}$ | + | + |
| 7 | HEDP-2TEA | $2.4 \times 10^{-2}$ | $2.7 \times 10^{-2}$ | + | + |
| 8 | HEDP-2(2-EHA) | $2.2 \times 10^{-2}$ | $2.5 \times 10^{-2}$ | + | + |
| 9 | HEDP-4(2EHA) | $2.3 \times 10^{-2}$ | $2.4 \times 10^{-2}$ | + | + |
| 10 | HDDP | $2.6 \times 10^{-2}$ | $26 \times 10^{-2}$ | + | + |
| 11 | HODP | $2.3 \times 10^{-2}$ | $2.7 \times 10^{-2}$ | + | + |
| 12 | HPhDP | $2.4 \times 10^{-2}$ | $2.6 \times 10^{-2}$ | + | + |
| 13* | Ethylenediaminetetraacetic acid | $3.9 \times 10^5$ | $4.3 \times 10^7$ | + | + |
| 14* | Disodium ethylenediaminetetraacetic acid | $8.0 \times 10^5$ | $9.5 \times 10^7$ | + | + |
| 15* | Nitrotriacetic acid | $5.1 \times 10^5$ | $3.5 \times 10^7$ | + | + |
| 16* | Tartaric acid | $2.0 \times 10^{-2}$ | $2.3 \times 10^{-2}$ | ± | + |

TABLE 1-continued

| Sample No. | Sequestering agent | Specific volume resistivity ($\Omega \cdot$ cm) | | Bleedout property | |
|---|---|---|---|---|---|
| | | After molding | 6 months after | After molding | 6 months after |
| 17* | Potassium tartrate | $5.0 \times 10^{-2}$ | $1.7 \times 10^3$ | + | — |
| 18* | Pyrophosphoric acid | $4.2 \times 10^{-2}$ | $4.9 \times 10^{-2}$ | — | — |

*Comparative sample

The metallic copper powder used above was washed with a 5% hydrochloric solution in a 1:1 mixture of water and ethanol, followed by washing with acetone. The metallic powder was then dried. AN 85 part amount of the dried metallic powder was kneaded with 15 parts of polyprpylene used above, under the same conditions. The mixture was press-molded to form a plate in the same manner as mentioned above.

The specific volume resistivity of the molded plate was as high as $7.3 \times 10^{-2}$ $\Omega$.cm after molding, but was remarkably decreased to $2.3 \times 10^3$ $\Omega$.cm after the molded plate was allowed to stand at room temperature for 7 days.

Example 2

Various amounts of HEDP listed in Table 2 were added to 15 parts of polypropylene and 85 parts of the metallic copper powder used in Example 1. The resultant mixtures were kneaded at a temperature of 180° C. in a labo-type plastomill, and then press molded to form 15 cm square plates having a thickness of 2 mm.

The electrical conductivity and the bleedout of HEDP from the molded plates were determined. The results were as shown in Table 2.

TABLE 2

| Sample No. | HEDP Parts | Specific volume resistivity ($\Omega \cdot$ cm) | | Bleedout property | |
|---|---|---|---|---|---|
| | | After molding | 6 months after | After molding | 6 months after |
| 19 | 0.5 | $3.2 \times 10^4$ | $4.5 \times 10^4$ | + | + |
| 20 | 1 | $5.5 \times 10^2$ | $6.3 \times 10^2$ | + | + |
| 21 | 2 | $1.3 \times 10$ | $2.2 \times 10$ | + | + |
| 22 | 3 | $5.3 \times 10^{-1}$ | $5.5 \times 10^{-1}$ | + | + |
| 23 | 4 | $4.0 \times 10^{-2}$ | $4.4 \times 10^{-2}$ | + | + |
| 24 | 7.5 | $2.1 \times 10^{-2}$ | $2.4 \times 10^{-2}$ | + | + |
| 25* | 7.8 | $2.0 \times 10^{-2}$ | $2.2 \times 10^{-2}$ | ± | ± |

TABLE 2-continued

| Sample No. | HEDP Parts | Specific volume resistivity ($\Omega \cdot$ cm) | | Bleedout property | |
|---|---|---|---|---|---|
| | | After molding | 6 months after | After molding | 6 months after |
| 26* | 10 | $1.9 \times 10^{-2}$ | $2.2 \times 10^{-2}$ | — | — |

*Comparative sample

Example 3

An 85 part amount of the metallic copper powder used in Example 1 and 5 parts of HEDP were incorporated into 15 parts of various thermoplastic resins listed in Table 3. The mixtures were kneaded in a labo-type plastomill. The resultant mixtures were press-molded to form 15 cm square plates having a thickness of 2 mm.

The electrical conductivity and bleedout property of the molded plates were as shown in Table 3.

TABLE 3

| Sample No. | Resin | HEDP (parts) | Specific volume Resistivity ($\Omega \cdot$ cm) | | Bleedout property | |
|---|---|---|---|---|---|---|
| | | | After molding | 6 months after | After molding | 6 months after |
| 27* | Low-density polyethylene | 0 | $1.0 \times 10^5$ | $5.9 \times 10^7$ | + | + |
| 28 | Low-density polyethylene | 5 | $2.0 \times 10^{-2}$ | $2.4 \times 10^{-2}$ | + | + |
| 29* | ABS | 0 | $3.7 \times 10^5$ | $7.2 \times 10^7$ | + | + |
| 30 | ABS | 5 | $2.4 \times 10^{-2}$ | $2.6 \times 10^{-2}$ | + | + |
| 31* | Polystyrene | 0 | $2.9 \times 10^5$ | $9.5 \times 10^6$ | + | + |
| 32 | Polystyrene | 5 | $2.3 \times 10^{-2}$ | $2.5 \times 10^{-2}$ | + | + |

*Comparative sample

Example 4

Various amounts, listed in Table 4, of the metallic copper powder used in Example 1 were added to the polypropylene used in Example 1. The HEDP was added to the resultant mixtures in an amount of 5 parts per 100 parts of the total amount of the copper powder and the polypropylene. The resultant mixtures were press-molded to form 15 cm square plates having a thickness of 2 mm.

The electrical conductivity and the bleedout property of the resultant molded plates, together with the mixing or kneading characteristics during the kneading, were as shown in Table 4. Composition sample No. 40 exhibited a remarkably high torque value during the kneading and could not be press-molded to form a 15 cm square plate.

TABLE 4

| Sample No. | Composition | | Specitic volume resistivity ($\Omega \cdot$ cm) | | Bleedout property | | Mixing Characteristics |
|---|---|---|---|---|---|---|---|
| | Polypropylene (parts) | Copper powder (parts) | After molding | 6 months after | After molding | 6 months after | Rotor torque (kg · cm) |
| 33* | 50 | 50 | $1.1 \times 10^{10}$ | $1.5 \times 10^{10}$ | None | None | 170 |
| 34 | 40 | 60 | $1.0 \times 10^4$ | $1.3 \times 10^4$ | None | None | 175 |
| 35 | 30 | 70 | $8.0 \times 10^{-2}$ | $8.2 \times 10^{-2}$ | None | None | 175 |
| 36 | 20 | 80 | $3.9 \times 10^{-2}$ | $4.2 \times 10^{-2}$ | None | None | 180 |
| 37 | 15 | 85 | $2.2 \times 10^{-2}$ | $2.4 \times 10^{-2}$ | None | None | 185 |
| 38 | 10 | 90 | $2.2 \times 10^{-2}$ | $2.3 \times 10^{-2}$ | None | None | 200 |

TABLE 4-continued

| Sample No. | Composition | | Specific volume resistivity (Ω · cm) | | Bleedout property | | Mixing Characteristics |
|---|---|---|---|---|---|---|---|
| | Polypropylene (parts) | Copper powder (parts) | After molding | 6 months after | After molding | 6 months after | Rotor torque (kg · cm) |
| 39 | 7.7 | 92.3 | $1.9 \times 10^{-2}$ | $2.2 \times 10^{-2}$ | None | None | 250 |
| 40* | 5.7 | 94.3 | — | — | — | — | 500 |

*Comparative sample

Example 5

Various kinds of metallic powder or metallic fibers were incorporated into the polypropylene used in Example 1 in an amount listed in Table 5, and 3 to 5 parts, based on 100 parts of the metallic powder or fiber, of HEDP were added thereto. The mixtures were kneaded by using a labo-type plastomill. The resultant mixtures were press-molded to form 15 cm square plates having a thickness of 2 mm.

The electrical conductivity and the bleedout property of the molded plates were as shown in Table 5.

thickness was 100 μm. The coating was dried at a temperature of 70° C. for 30 minutes. Thereafter, the surface resistances and electromagnetic wave shield effects were determined. Furthermore, the surface resistances were determined after allowing to stand for one year at room temperature and for 20 days at a temperature of 100° C. and the electromagnetic shield effectivenesses were determined after allowing to stand at a temperature of 100° C. for 20 days.

The results are shown in Table 6.

In Example 6, Run No. 49 shows a composition not containing a diphosphonic acid derivative and Run

TABLE 5

| Sample No. | Kind of metallic powder | Composition | | | Specific volume resistivity (Ω · cm) | | Bleedout property | |
|---|---|---|---|---|---|---|---|---|
| | | Polypropylene (parts) | Metal (parts) | HEDP (parts) | After molding | 6 months after | After molding | 6 months after |
| 41* | Iron powder | 15 | 85 | 0 | $9.5 \times 10^{5}$ | $2.3 \times 10^{8}$ | + | + |
| 42 | Iron powder | 15 | 85 | 5 | $2.4 \times 10^{-2}$ | $2.9 \times 10^{-2}$ | + | + |
| 43* | Brass fibers | 40 | 60 | 0 | $1.9 \times 10^{5}$ | $6.2 \times 10^{7}$ | + | + |
| 44 | Brass fibers | 40 | 60 | 3 | $3.9 \times 10^{0}$ | $4.2 \times 10^{0}$ | + | + |
| 45* | Aluminum flakes | 40 | 60 | 0 | $3.1 \times 10^{5}$ | $2.7 \times 10^{8}$ | + | + |
| 46 | Aluminum flakes | 40 | 60 | 3 | $4.8 \times 10^{-1}$ | $2.0 \times 10^{-1}$ | + | + |
| 47* | Nickel powder | 15 | 85 | 0 | $8.3 \times 10^{5}$ | $2.9 \times 10^{7}$ | + | + |
| 48 | Nickel powder | 15 | 85 | 3 | $2.5 \times 10^{-2}$ | $2.7 \times 10^{-2}$ | + | + |

*Comparative sample

In the following Examples, the electrical conductivity was evaluated in terms of surface reactivity (Ω/□) determined according to Japanese Industrial Standard (JIS)-K-6911 method and the electromagnetic wave shield effectiveness was determined by using a TR-4172 tester manufactured by Takeda Riken K.K.

Example 6

A 46.3 part amount of an ethyl acetate solution containing 25% by acrylic resin, 100 parts of electrolytic copper powder (350 mesh pass), 15.5 parts of an isopropyl alcohol (IPA) solution containing 20% of each diphosphonic acid derivative listed in Table 6, and 75 parts of ethyl acetate were mixed while stirring. Thus, an electrically conductive coating composition was obtained.

The resultant coating composition was coated on a polyester film in such a manner that the dry coating Nos. 50 to 55 show compositions containing diphosphonic acid derivatives. As is clear from the results shown in Table 6, the surface resistance values and the shield effectivenesses of the present compositions of Run Nos. 50 to 55 immediately after drying were about $4 \times 10^{-1}$ Ω/□ and about 60 dB, respectively. When these values are compared to those of the reference Run No. 49, the resistances of the present compositions are one-tenth of the reference Run No. 49 and the shield effectivenesses thereof are improved by about 20 dB immediately after drying, at 300 MHz. Furthermore, in the exposure tests at room temperature and 100° C., the metallic powder was gradually oxidized with the lapse of time in the case of Run No. 49, so that the electrical conductivity and shield effects were remarkably decreased. Contrary to this, these changes with the lapse of time were not observed in the case of Run Nos. 50 to 55.

TABLE 6

| Run No. | 49 | 50 | 51 | 52 | 53 | 54 | 55 | 56 | 57 | 58 |
|---|---|---|---|---|---|---|---|---|---|---|
| Electrically conductive coating composition (part) | | | | | | | | | | |
| Copper powder | 100 | 100 | 100 | 100 | 100 | 100 | 100 | 100 | 100 | 100 |
| Acrylic resin/ethyl acetate (25%) | 46.3 | 46.3 | 46.3 | 46.3 | 46.3 | 46.3 | 46.3 | 46.3 | 46.3 | 46.3 |
| HEDP/IPA (20%) | 0 | 15.5 | 0 | 0 | 0 | 0 | 0 | | | |
| HEDP-2Na/IPA (20%) | 0 | 0 | 15.5 | 0 | 0 | 0 | 0 | | | |
| HEDP-2NH$_3$/IPA (20%) | 0 | 0 | 0 | 15.5 | 0 | 0 | 0 | | | |
| HEDP-2TEA/IPA (20%) | 0 | 0 | 0 | 0 | 15.5 | 0 | 0 | | | |
| HEDP-4TEA/IPA (20%) | 0 | 0 | 0 | 0 | 0 | 15.5 | 0 | | | |
| HEDP-2NH$_2$-Ph/IPA (20%) | 0 | 0 | 0 | 0 | 0 | 0 | 15.5 | | | |
| Ethyl acetate | 75 | 75 | 75 | 75 | 75 | 75 | 75 | | | |
| HDDP/IPA (20%) | | | | | | | | 15.5 | 0 | 0 |
| HODP/IPA (20%) | | | | | | | | 0 | 15.5 | 0 |
| HPhDP/IPA (20%) | | | | | | | | 0 | 0 | 15.5 |

TABLE 6-continued

| Run No. | | 49 | 50 | 51 | 52 | 53 | 54 | 55 | 56 | 57 | 58 |
|---|---|---|---|---|---|---|---|---|---|---|---|
| | | Surface resistance, $\Omega/\square$ | | | | | | | | | |
| Immediately after drying | | 2.44 | 0.38 | 0.40 | 0.43 | 0.39 | 0.41 | 0.40 | 0.40 | 0.39 | 0.42 |
| Room temperature, after one year | | $2.8 \times 10^2$ | 0.41 | 0.39 | 0.43 | 0.38 | 0.39 | 0.41 | 0.41 | 0.39 | 0.41 |
| 100° C., after 4 days | | $2.5 \times 10^2$ | 0.38 | 0.42 | 0.39 | 0.40 | 0.42 | 0.42 | 0.40 | 0.40 | 0.41 |
| 100° C., after 5 days | | $2.0 \times 10^3$ | 0.41 | 0.43 | 0.41 | 0.42 | 0.38 | 0.41 | 0.43 | 0.41 | 0.42 |
| 100° C., after 20 days | | $6.4 \times 10^8$ | 0.40 | 0.41 | 0.42 | 0.39 | 0.41 | 0.41 | 0.42 | 0.41 | 0.42 |
| | | Electromagnetic wave shield effectiveness, dB (electric field) | | | | | | | | | |
| Immediately after drying | 100 MHz | 48 | 60 | 58 | 59 | 57 | 58 | 57 | 58 | 57 | 57 |
| | 200 MHz | 43 | 63 | 63 | 63 | 62 | 62 | 62 | 63 | 62 | 63 |
| | 300 MHz | 39 | 63 | 62 | 63 | 62 | 63 | 62 | 62 | 62 | 62 |
| 100° C., after 20 days | 100 MHz | 6 | 59 | 58 | 58 | 57 | 59 | 57 | 59 | 58 | 57 |
| | 200 MHz | 5 | 63 | 62 | 63 | 62 | 63 | 72 | 63 | 63 | 62 |
| | 300 MHz | 5 | 63 | 63 | 62 | 62 | 63 | 71 | 63 | 62 | 63 |

Example 7

A 50 g amount of electrolytic copper powder (350 mesh pass) was added to 100 g of an alcohol solution containing 3% of each diphosphonic acid derivative listed in Table 7. After the mixture was stirred at room temperature for 15 minutes, the copper powder was filtered and dried in vacuo at a temperature of 40° C. for 8 hours. A 100 part amount of the resultant copper powder, 46.3 parts of an ethyl acetate solution containing 25% of an acrylic resin, and 87.5 parts of ethyl acetate were mixed while stirring to obtain an electrically conductive coating composition.

The coating composition was evaluated, after coating and drying, in the same manner as in Example 6. The results are shown in Table 7.

As in Run No. 50 to 55 of Example 6, the coating compositions according to the present invention exhibited excellent electrical conductivity and electromagnetic shield effectiveness and did not exhibit an unpreferable decrease in the electrical conductivity and shield effectiveness with the lapse of time.

The copper powder used in this example was washed with water and the amount of the diphosphonic acid derivative adhered to the copper powder was determined. As a result, the amount was 0.5 parts based on 100 parts of the copper powder.

TABLE 7

| Run No. | 59 | 60 | 61 | 62 | 63 | 64 | 65 | 66 |
|---|---|---|---|---|---|---|---|---|
| | Cu powder treated solution phosphonic acid | | | | | | | |
| Diphosphonic acid derivative | Phosphonic acid | Pyrrophosphonic acid | HEDP | HEDP-2TEA | HEDP-4TEA | HDDP | HODP | HPhDP |
| Alcohol | IPA | methanol | IPA | methanol | methanol | IPA | IPA | IPA |
| | Electromagnetic shield effectiveness, dB (electric field) | | | | | | | |
| Treated Cu powder | 100 | 100 | 100 | 100 | 100 | 100 | 100 | 100 |
| Acrylic resin/ethyl acetate (25%) | 46.3 | 46.3 | 46.3 | 46.3 | 46.3 | 46.3 | 46.3 | 46.3 |
| Ethyl acetate | 87.5 | 87.5 | 87.5 | 87.5 | 87.5 | 87.5 | 87.5 | 87.5 |
| | Surface resistance, $\Omega/\square$ | | | | | | | |
| Immediately after drying | 5.50 | 4.38 | 0.36 | 0.33 | 0.41 | 0.36 | 0.33 | 0.37 |
| Room temperature after one year | 9.38 | $1.2 \times 10^1$ | 0.35 | 0.35 | 0.38 | 0.35 | 0.35 | 0.37 |
| 100° C., after 4 days | $1.3 \times 10^1$ | $1.8 \times 10^1$ | 0.39 | 0.38 | 0.39 | 0.39 | 0.37 | 0.39 |
| 100° C., after 8 days | $2.7 \times 10^1$ | $3.3 \times 10^2$ | 0.39 | 0.37 | 0.39 | 0.38 | 0.34 | 0.34 |
| 100° C., after 20 days | $3.3 \times 10^3$ | $3.2 \times 10^3$ | 0.38 | 0.36 | 0.39 | 0.37 | 0.36 | 0.38 |
| | Electrically conductive coating composition (part) | | | | | | | |
| Immediately after drying 100 MHz | 43 | 41 | 58 | 60 | 60 | 58 | 60 | 60 |
| 200 MHz | 39 | 38 | 63 | 61 | 62 | 63 | 61 | 62 |
| 300 MHz | 32 | 33 | 63 | 63 | 63 | 63 | 63 | 63 |
| 100° C. after 20 days 100 MHz | 10 | 9 | 59 | 59 | 60 | 59 | 59 | 60 |
| 200 MHz | 9 | 6 | 63 | 61 | 61 | 63 | 61 | 61 |
| 300 MHz | 6 | 5 | 63 | 63 | 62 | 62 | 63 | 62 |

Example 8

The electrically conductive coating compositions were obtained by adding varied amounts of an IPA solution containing 20% of HEDP to a mixture of 100 parts of electrolytic copper powder (350 mesh pass), 46.3 parts of an ethyl acetate solution containing 25% of acrylic resin, and 75 parts of ethyl acetate, followed by mixing while stirring.

The resultant compositions were evaluated, after coating and drying, in the same manner as in Example 6. The results are shown in Table 8.

TABLE 8

| Run No. | 67 | 68 | 69 | 70 | 71 | 72* |
|---|---|---|---|---|---|---|
| Addition amount (part) of HEDP based on 100 parts Cu powder | 0.1 | 0.3 | 3.1 | 5.0 | 8.0 | 8.5 |
| | Surface resistance, $\Omega/\square$ | | | | | |
| Immediately after drying | 1.52 | 0.38 | 0.33 | 0.35 | 0.40 | — |
| Room temperature after one year | 5.46 | 1.38 | 0.39 | 0.39 | 0.38 | — |
| 100° C., after 4 days | 6.01 | 1.29 | 0.34 | 0.38 | 0.39 | — |

TABLE 8-continued

| Run No. | 67 | 68 | 69 | 70 | 71 | 72* |
|---|---|---|---|---|---|---|
| 100° C., after 8 days | $2.8 \times 10^2$ | 4.83 | 0.41 | 0.40 | 0.39 | — |
| 100° C., after 20 days | $3.0 \times 10^3$ | $1.0 \times 10^1$ | 0.40 | 0.39 | 0.41 | — |

*Since the composition could not be formed into a paste and coating was impossible, the surface resistance could not be determined

Example 9

The electrically conductive coating compositions were obtained by incorporating 100 parts of metallic copper powder, 75 parts of a diluting solvent, 15.5 parts of an IPA solution containing 20% of HEDP, and 1.5 parts of colloidal silica.

The resultant compositions were evaluated, after coating and drying, in the same manner as in Example 6. The results are shown in Table 9.

TABLE 9

| Run No. | 73 | 74 | 75 | 76 | 77 | 78 | 79 | 80 |
|---|---|---|---|---|---|---|---|---|
| Electrically conductive coating composition (part) | | | | | | | | |
| Cu powder | 100 | 100 | 100 | 100 | 100 | 100 | 100 | 100 |
| Acrylic resin/ethyl acetate (25%) | 46.3 | 46.3 | 0 | 0 | 0 | 0 | 0 | 0 |
| PVA resin/isoamyl acetate (25%) | 0 | 0 | 46.3 | 46.3 | 0 | 0 | 0 | 0 |
| Epoxy resin/butyl carbitol (25%) | 0 | 0 | 0 | 0 | 46.3 | 46.3 | 0 | 0 |
| Urethane resin/toluene (25%) | 0 | 0 | 0 | 0 | 0 | 0 | 46.3 | 46.3 |
| Ethyl acetate | 75 | 75 | 0 | 0 | 0 | 0 | 0 | 0 |
| Isoamyl acetate | 0 | 0 | 75 | 75 | 0 | 0 | 0 | 0 |
| Butyl carbitol | 0 | 0 | 0 | 0 | 75 | 75 | 0 | 0 |
| Toluene | 0 | 0 | 0 | 0 | 0 | 0 | 75 | 75 |
| HEDP/IPA (20%) | 15.5 | 0 | 15.5 | 0 | 15.5 | 0 | 15.5 | 0 |
| Colloidal silica | 1.5 | 1.5 | 1.5 | 1.5 | 1.5 | 1.5 | 1.5 | 1.5 |
| Drying temperature (°C.) and time (hr) | 70, 0.5 | 70, 0.5 | 150, 0.5 | 150, 0.5 | 180, 1 | 180, 1 | 25, 24 | 25, 24 |
| Surface resistance, Ω/□ | | | | | | | | |
| Immediately after drying | 0.39 | 2.48 | 0.39 | 2.48 | 0.35 | 4.82 | 0.38 | 3.89 |
| Room Temperature, after one year | 0.38 | $2.9 \times 10^2$ | 0.33 | $2.8 \times 10^2$ | 0.36 | $3.8 \times 10^2$ | 0.37 | $4.9 \times 10^2$ |
| 100° C., after 4 days | 0.41 | $3.1 \times 10^2$ | 0.41 | $3.1 \times 10^2$ | 0.38 | $3.0 \times 10^2$ | 0.36 | $2.9 \times 10^2$ |
| 100° C., after 8 days | 0.42 | $2.0 \times 10^3$ | 0.41 | $9.2 \times 10^2$ | 0.37 | $2.3 \times 10^3$ | 0.36 | $2.9 \times 10^3$ |
| 100° C., after 20 days | 0.41 | $6.4 \times 10^6$ | 0.38 | $9.8 \times 10^6$ | 0.37 | $2.9 \times 10^6$ | 0.39 | $3.1 \times 10^5$ |
| Electromagnetic wave shield effectiveness, dB (electric field) | | | | | | | | |
| Immediately after drying  100 MHz | 58 | 47 | 60 | 48 | 60 | 47 | 59 | 51 |
| 200 MHz | 63 | 42 | 63 | 43 | 60 | 42 | 60 | 50 |
| 300 MHz | 62 | 39 | 63 | 38 | 62 | 39 | 63 | 41 |
| 100° C., after 20 days  100 MHz | 57 | 6 | 58 | 10 | 57 | 9 | 58 | 8 |
| 200 MHz | 62 | 4 | 62 | 9 | 62 | 6 | 60 | 7 |
| 300 MHz | 63 | 4 | 63 | 8 | 63 | 3 | 63 | 6 |

Example 10

The electrically conductive coating compositions were obtained as follows.

An ethyl acetate solution containing 25% of acrylic resin and electrolytic copper powder (350 mesh pass) were added in varied amounts to 75 parts of ethyl acetate such that the total amount of the ethyl acetate solution and copper powder was 147.5 parts. Thereafter, an IPA solution containing 20% of HEDP was added to the mixture in such a manner that the amount of HEDP was 3 parts based on 100 parts of the copper powder. The mixture was mixed while stirring to obtain the coating compositions.

The resultant coating compositions were evaluated, after coating and drying, in the same manner as in Example 6. The results are shown in Table 10.

TABLE 10

| Run No. | 81 | 82 | 83 | 84 | 85* |
|---|---|---|---|---|---|
| Solid content (part) of coating composition | | | | | |
| Cu powder | 50 | 65 | 80 | 90 | 92 |
| Acrylic resin | 50 | 35 | 20 | 10 | 8 |
| HEDP | 1.5 | 2.0 | 2.4 | 2.7 | 2.8 |
| Surface resistance, Ω/□ | | | | | |
| Immediately after drying | $1.2 \times 10^6$ | 1.25 | 0.41 | 0.38 | — |
| Room temperature, after one year | $1.8 \times 10^6$ | 1.31 | 0.39 | 0.41 | — |
| 100° C., after 4 days | $2.0 \times 10^6$ | 1.30 | 0.38 | 0.38 | — |
| 100° C., after 8 days | $1.7 \times 10^6$ | 1.29 | 0.37 | 0.41 | — |
| 100° C., after 20 days | $1.8 \times 10^6$ | 1.27 | 0.40 | 0.40 | — |

*Since the composition could not be formed into a paste and coating was impossible, the surface resistance could not be determined.

Example 11

The electrically conductive coating compositions were obtained by mixing, while stirring, 100 parts of various metallic powders listed in Table 11, 46.3 parts of an ethyl acetate solution containing 25% of acrylic resin, 15.5 parts of an IPA solution containing 20% of HEDP, and 75 parts of ethyl acetate.

The resultant coating compositions were evaluated, after coating and drying, in the same manner as in Example 6. The results are shown in Table 11.

TABLE 11

| Run No. | 86 | 87 | 88 | 89 | 90 | 91 |
|---|---|---|---|---|---|---|
| Ni powder | 100 | 100 | 0 | 0 | 0 | 0 |
| Al powder | 0 | 0 | 100 | 100 | 0 | 0 |
| Fe powder | 0 | 0 | 0 | 0 | 100 | 100 |
| Acrylic resin/ethyl acetate (25%) | 46.3 | 46.3 | 46.3 | 46.3 | 46.3 | 46.3 |
| HEDP/IPA (20%) | 15.5 | 0 | 15.5 | 0 | 15.5 | 0 |
| Ethyl acetate | 75 | 75 | 75 | 75 | 75 | 75 |
| Surface resistance, $\Omega/\square$ | | | | | | |
| Immediately after drying | 0.68 | 3.59 | 0.71 | 2.10 | 2.18 | $3.2 \times 10^2$ |
| Room temperature, after one year | 0.69 | 6.81 | 0.78 | 4.18 | 2.20 | $3.3 \times 10^4$ |
| 100° C., after 4 days | 0.67 | 6.92 | 0.75 | 4.29 | 2.09 | $3.2 \times 10^4$ |
| 100° C., after 8 days | 0.65 | $6.1 \times 10^1$ | 0.76 | $7.9 \times 10^1$ | 2.10 | $3.3 \times 10^6$ |
| 100° C., after 20 days | 0.66 | $9.1 \times 10^1$ | 0.72 | $1.0 \times 10^2$ | 2.12 | $3.9 \times 10^6$ |
| Electromagnetic shield effectiveness, dB (electric field) | | | | | | |
| Immediately after drying 100 MHz | 65 | 31 | 54 | 31 | 32 | 12 |
| 200 MHz | 63 | 20 | 62 | 23 | 30 | 9 |
| 300 MHz | 63 | 11 | 62 | 12 | 29 | 9 |
| 100° C., after 20 days 100 MHz | 57 | 19 | 55 | 18 | 31 | 5 |
| 200 MHz | 62 | 20 | 63 | 21 | 20 | 4 |
| 300 MHz | 63 | 17 | 61 | 14 | 13 | 2 |

We claim:

1. An electrically conductive thermoplastic resin composition comprising:
   (i) at least one thermoplastic resin selected from the group consisting of low-density polyethylene, high-density polyethylene, linear low-density polyethylene, polypropylene, polystyrene, ethylene-vinyl acetate copolymer, ABS resin, MMA resin, ethylene-acrylate copolymer, polyamide resin, and polyester resin;
   (ii) at least one metallic powder selected from the group consisting of nickel, copper, iron, and aluminum, and the alloys thereof; and
   (iii) 0.5 to 9 parts by weight, based on 100 parts by weight of the metallic powder, of diphosphonic acid having the general formula:

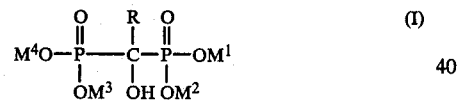

wherein R represents an alkyl group having 1 to 18 carbon atoms, a phenyl group, or an alkylphenyl group having an alkyl group with 1 to 8 carbon atoms and $M^1$ to $M^4$ independently represent hydrogen or a cation;
   the weight ratio of the component (i) to the component (ii) (i.e., (i)/(ii)) being 40/60 to 6/94.

2. An electrically conductive thermoplastic resin composition as claimed in claim 1, wherein the diphosphonic acid is 1-hydroxyethane-1,1-diphosphonic acid (HEDP), disodium 1-hydroxyethane-1,1-diphosphonate (HEDP-2Na) calcium 1-hydroxyethane-1,1-diphosphonate (HEDP-Ca), diammonium 1-hydroxyethane-1,1-diphosphonate (HEDP-2NH₃), ditriethanol amine 1-hydroxyethane-1,1-diphosphonate (HEDP-2TEA), tetratriethanol amine 1-hydroxyethane-1,1-diphosphonate (HEDP-4TEA), dianiline 1-hydroxyethane-1,1-diphosphonate (HEDP-2NH₂-Ph), di(2-ethyl)hexylamine 1-hydroxyethane-1,1-diphosphonate (HEDP-2EHA), tetra(2-ethyl)hexylamine 1-hydroxyethane-1,1-diphosphonate (HEDP-4EHA), 1-hydroxypropane-1,1-diphosphonic acid (HPDP), 1-hydroxydodecane-1,1-diphosphonic acid (HDDP), 1-hydroxyoctadecane-1,1-diphosphonic acid (HODP), 1-hydroxyphenylmethane-1,1-diphosphonic acid (HPhDP), 1-hydroxybutane-1,1-diphosphonic acid (HBDP), 1-hydroxyheptane-1,1-diphosphonic acid, 1-hydroxyhexane-1,1-diphosphonic acid, 1-hydroxy-1-(p-methyl)phenylmethane-1,1-diphosphonic acid, and 1-hydroxy-1-(p-ethyl)phenylmethane-1,1-diphosphonic acid.

3. An electrically conductive thermoplastic resin composition as claimed in claim 1, wherein the thermoplastic resin is polypropylene, low-density polyethylene, ABS resin, polystyrene, polyamide resin, or polyester resin.

4. An electrically conductive thermoplastic resin composition as claimed in claim 1, wherein the metallic powder is nickel, copper, iron, aluminum, or an alloy thereof.

5. An electrically conductive coating composition comprising:
   (i) at least one metallic powder;
   (ii) at least one film-forming resin selected from the group consisting of thermoplastic resins and thermosetting resins; and
   (iii) at least one diphosphonic acid derivative having the formula:

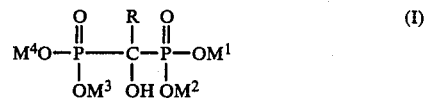

wherein R represents an alkyl or aryl group and $M^1$ to $M^4$ independently represent hydrogen or a cation.

6. An electrically conductive coating composition as claimed in claim 5, wherein the metallic powder is nickel, copper, iron, aluminum, or an alloy thereof.

7. An electrically conductive coating composition as claimed in claim 5, wherein the resin is at least one thermoplastic resin selected from the group consisting of thermoplastic acrylic resins, vinyl resins, urethane resins, alkyd resins, polyester resins, and hydrocarbon resins.

8. An electrically conductive coating composition as claimed in claim 5, wherein the resin is at least one thermosetting resin selected from the group consisting of thermosetting acrylic resins, phenol resins, unsaturated polyester resins, epoxy resins, urethane resins, and alkyd resins.

9. An electrically conductive coating composition as claimed in claim 5, wherein R in the formula (I) represents an alkyl group having 1 to 18 carbon atoms, a phenyl group, or an alkylphenyl group having an alkyl group with 1 to 8 carbon atoms.

10. An electrically conductive coating composition as claimed in claim 5, wherein the diphosphonic acid derivative is at least one compound selected from the group consisting of 1-hydroxyethane-1,1-diphosphonic acid (HEDP), disodium 1-hydroxyethane-1, 1-diphosphonate (HEDP-2Na) calcium 1-hydroxyethane-1,1-diphosphonate (HEDP-Ca), diammonium 1-hydroxyethane-1,1-diphosphonate (HEDP-2NH$_3$), ditriethanol amine 1-hydroxyethane-1,1-diphosphonate (HEDP-2TEA), tetratriethanol amine 1-hydroxyethane-1,1-diphosphonate (HEDP-4TEA), dianiline 1-hydroxyethane-1,1-diphosphonate (HEDP-2NH$_2$-Ph), 1-hydroxypropane-1,1-diphosphonic acid, 1-hydroxydodecane-1,1-diphosphonic acid, 1-hydroxyoctadecane-1,1-diphosphonic acid, and 1-hydroxyphenylmethane-1,1-diphoshonic acid.

11. An electrically conductive coating composition as claimed in claim 5, wherein the amount of the diphosphonic acid derivative is within the range of from 0.1 to 8.0 parts by weight based on 100 parts by weight of the metallic powder contained in the coating composition.

12. An electrically conductive coating composition as claimed in claim 5, wherein the amount of the metallic powder is within the range of from 35% to 94% by weight based on the total amount of the resin and the metallic powder in the coating composition.

13. An electrically conductive coating composition as claimed in claim 5, wherein the composition further contains a diluting solvent.

14. An electrically conductive coating composition as claimed in claim 13, wherein the solvent is at least one member selected from the group consisting of methyl ethyl ketone, methyl isobutyl ketone, ethyl acetate, butyl acetate, ethanol, buthanol, toluene, xylene, turpentine oil, butyl cellosolve, and carbitol.

15. An electrically conductive coating composition as claimed in claim 13, wherein the amount of the solvent is within the range of from 10 to 500 parts by weight based on 100 parts of the total amount of the metallic powder and the resin.

* * * * *